April 21, 1970     G. ERKAN     3,507,979

HIGH STRENGTH CERAMIC STANDOFF

Filed Dec. 12, 1968

INVENTOR
GUNDUZ ERKAN
BY
Maleson, Kimmelman & Ratner
ATTORNEYS

United States Patent Office 3,507,979
Patented Apr. 21, 1970

3,507,979
HIGH STRENGTH CERAMIC STANDOFF
Gunduz Erkan, Hewitt, N.J., assignor to Fansteel, Inc., Mahwah, N.J., a corporation of New York
Filed Dec. 12, 1968, Ser. No. 783,318
Int. Cl. H01b *17/00;* C03c *27/04*
U.S. Cl. 174—176          8 Claims

ABSTRACT OF THE DISCLOSURE

A ceramic member having a blind hole in the upper end thereof is metalized (1) on its upper end and throughout the hole and (2) on a band formed about the bottom half of its outside surface. A terminal is seated within the hole and brazed to the upper end of the member. The metalized band is brazed to a metal base.

BACKGROUND OF THE INVENTION

Field of the invention

This invention pertains to the field of art of ceramic to metal seals in which one or more metal conductors are sealed to a ceramic base thereby insulating each conductor from the walls of the container and from the other conductors.

Prior art

Ceramic to metal seals have important advantages to seals of other materials such as glass and have become widely used as production techniques have improved. These production techniques are described for example in Ceramic Age, September 1962, "Ceramic to Metal Seals: Making a Market Grow," by R. Francis Tatnall. Ceramic seals have the advantages of high reliability because of excellent mechanical properties, high surface resistivity at high humidity and chemical clean surfacing. Ceramic to metal seals may be used for standoffs which are used when a connection is to be insulated from its base. In this manner the connection or conductor may be insulated from the walls of a container or chassis. Such seals may also be used for feed-throughs in which an electric connection is brought through the walls of a container or chassis.

In order to provide the ceramic to metal seal, it is necessary to metalize desired areas or portions of the ceramic material. As described in Printed and Integrated Circuitry by T. D. Schlaback and D. K. Rider, page 106 et seq., molybdenum-manganese (Mo-Mn) may be used to penetrate the ceramic to form a metalized coating. By using painting, spraying or silk screen printing techniques, desired patterns of metalized coating may be formed on the ceramic material. For example, Mo-Mn in mixture with a suitable liquid carrier and binder may be applied through a silk screen to coat areas of the ceramic in accordance with the pattern. The coated ceramic is then heated in an oven so that the Mo-Mn provides a tightly adhering metalized coating on the screened area of the ceramic. In this manner, there is formed, a molecular bond between the Mo-Mn and the ceramic. Since the metalized coating cannot be wetted by brazing materials, the metalized areas are required to be plated. By placing the ceramic material in a nickel plating bath, nickel is plated only onto the metalized area.

In making a standoff it has been known to use a ceramic cylinder or disk which is metalized at both ends and then plated. One of the cylinder ends has then been brazed directly to a metal base. A terminal in the form of a nail headed terminal lead is brazed to the other metalized end of the cylinder by brazing the nail head face to the end. However, the joints formed by the foregoing brazing operation have left much to be desired since they have the character of shear joints. The strain caused by the mismatch in the coefficient of expansions of the terminal and of the base with respect to the ceramic cause shear stresses that fracture the ceramic and weaken the bond. Even if the shear stresses are not high enough to cause the foregoing type of failure, there has been found to be a reduction in the allowable stresses in tension or bending on the terminal under the combined stresses.

BRIEF SUMMARY OF THE INVENTION

A ceramic member is formed having a blind hole in the upper end. The upper end and the hole are metalized as well as a band formed about the bottom half of its outside surface. The metalized areas are then plated. A terminal is seated in the hole and brazed to the upper end of the member. The metalized band is brazed to a metal base providing a metallic compressive bond between the member and the base thereby stressing the ceramic material in a direction where it is the strongest.

BRIEF DESCRIPTION OF THE DRAWING

Referring now to FIGS. 1–3 there is shown a standoff comprising a cylindrically shaped metal terminal lead 10 and a substantially larger diameter cylindrically shaped ceramic member 11. Ceramics of differing types are well known in the art and are described in detail in the above cited text, Printed and Integrated Circuitry, page 139 et seq. Ceramics of high alumina content are preferred as they exhibit the best all-around insulation, have high mechanical strength retained to very high temperatures, high impact strength and thermal shock resistance. In addition, these ceramics are chemically inert, extremely hard and resist abrasions as well as being dimensionally stable. Alumina ceramics can be made vacuum tight and are thus particularly useful in forming ceramic to metal seals. Further features of alumina ceramics important for the purposes outlined above are that they exhibit a particularly high thermal conductivity for adequate heat dissipation, high surface resistivity and a chemically clean nature of the surface.

Figure 1:
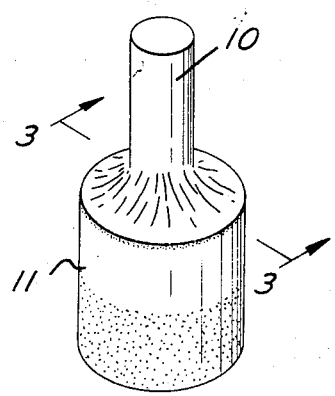
FIGS. 1–2 are perspective views of a ceramic member and terminal in accordance with the invention.

In forming ceramic member 11 in the shape illustrated, alumina powder may be mixed with silicate and a small percentage of ceramics, put into a press and pressed at very high pressure. The ceramic is then fired at a very high temperature and finished.

Member 11 is formed having a cylindrically shaped blind hole 12 defined in the center of the upper end 11a thereof. Upper end 11a is metalized as well as the cylindrical inner wall 12a and lower end inner wall 12b of hole 12. In addition a metalized band 14 is formed on the outside cylindrical wall or surface of member 11 extending from about the center of the height of the outside wall to the lower end 11b of member 11. The remaining portions of member 11 are left free of metalization and it is to be particularly noted that the lower end 11b or base of member 11 is free of metalization in contrast to standoffs of the prior art.

In forming the metalized coated areas 11a, 12a, 12b and 14, an Mo-Mn mixture is first prepared by mixing 80% molybdenum and 20% manganese with suitable liquid carriers and binders to a suitable viscosity. The viscosity selected is dependent on whether the mixture is painted, sprayed or printed on the ceramic. As understood by those skilled in the art, other proportions of Mo-Mn may be used with different carriers and binders in accordance with the thickness of the coating desired and the particular ceramic used. The thickness of the coating is very important, with a preferred thickness being between .001–.002 inch. It has been found that if the thickness of the coating is less than .0005 inch the molecules of Mo-Mn do not touch and the coating cannot be plated. On the other hand, if the coating is too thick it will form bubbles when the ceramic is fired.

After the mixture is applied to member 11, the member is then placed in an oven and fired at a suitable temperature, as for example 1500° C. In this manner, a tightly adhering coating of Mo-Mn is formed on the areas 11a, 12a, 12b and 14 of member 11 with the remaining areas of the member not metalized. The metalized areas are then prepared for brazing by plating a sufficient amount of nickel only on the areas 11a, 12a, 12b and 14. Specifically, member 11 is placed in a nickel plating bath so that nickel plates only onto these metalized areas.

Figure 3:
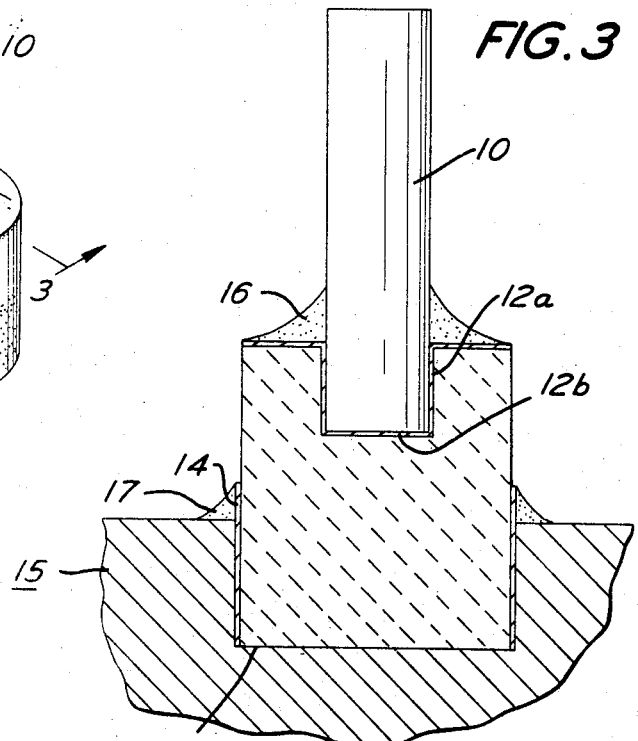
FIG. 3 is a cross-sectional view taken along 3—3 of FIG. 1 in which the member is seated in a hole in the base metal.

Terminal 10 is then seated within hole 12 as best illustrated in FIG. 3. It will be noted that blind hole 12 is formed of diameter so that after metalizing and plating inner wall area 12a, terminal 10 fits snugly within the hole. Terminal 10 is then brazed, using hard solder (forming fillet 16) to the metalized upper end surface 11a of member 11. Member 11 may then be seated in a blind cylindrical hole 18 of base metal 15. Hole 18 is of diameter to snugly receive the metalized outer band 14 of member 11. The depth of hole 18 is selected so that with member 11 seated within the hole the metalized band 14 extends slightly above the upper surface of base metal 15. Thus area 14 may be brazed to metal 15 by way of braze material forming a fillet 17. Accordingly, there is formed a metallic compressive bond between band 14 and the lower end or wall of hole 18. In this manner, member 11 is placed in compression and the strength of the assembly shown in FIG. 3 results from the compression on the ceramic member exerted by fillet 17 as well as the base metal 15 which surrounds member 11.

Figure 4:
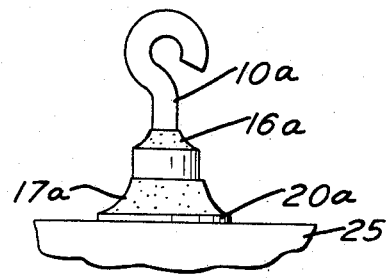
FIGS. 4 and 5 show the member of FIGS. 1 and 2 seated on a flat base plate.
Figure 5:
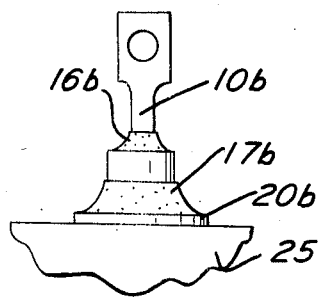

Instead of mounting member 11 within a blind hole it can be brazed directly on the surface of flat metal base plates 20a and 20b as shown in FIGS. 4 and 5 respectively. Accordingly, as shown in FIG. 4, the lower end 11b of member 11 is seated on plate 20a and attached thereto by brazed material forming a fillet 17a. Similarly in FIG. 5, member 11 is seated on plate 20b with lower end 11b in contact with the plate and brazed. In both FIGS. 4 and 5, the brazed fillets 17a and 17b each form a metallic compressive bond between the metallized band 14 and plates 20a, 20b respectively. Thus the strength of each of the assemblies comes from the compression on the ceramic member exerted by the fillets.

In accordance with the invention, in FIGS. 3–5 the compression seal formed between band 14 of each of members 11 and the base metal provides the advantage of stressing the ceramic material in a direction where it is the strongest. In compression, ceramic is stronger by a factor of 10 compared with a shear or a tension joint. In addition, these compression seals as well as the seals 16–16b can withstand rapid temperature changes without cracking or fracturing. Further, terminals 10–10b by being anchored in a blind hole are very strong in tension and in bending. Accordingly, there is achieved high reliability in a standoff at a substantially low cost.

An additional important advantage of the invention is that the base or lower end 11b of member 11 in FIGS. 3–5 is left free of metallization. Thus there is eliminated the sheer failure of the ceramic that would result from strain caused by the mismatch of the coefficient of expansion between end 11b and the adjoining metal base.

Figure 2:
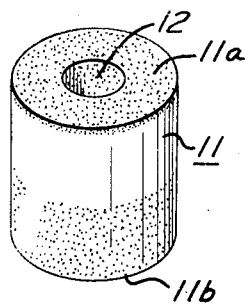

It will be understood that plates 20a and 20b may be welded or soldered to the walls of a container or a chassis 25. In addition, terminal 10 of FIGS. 1–3 may be formed into a circular terminal as shown in FIG. 4 or a terminal for receiving a screw as shown in FIG. 5.

Now that the invention has been explained it will be understood that many more modifications may be made. As for example, a plurality of terminals may be secured to a single ceramic member to provide multiple isolated terminals from the same ground plane. Instead of the same ground plane, a plurality of terminals may be anchored to a ceramic member and isolating metalizing used to maintain electrical separation.

What is claimed is:
1. A ceramic standoff for insulating a terminal comprising,
a base member,
a ceramic member defining a first and a second end and an outer wall between said first and second ends, said member having a blind hole in said first end, said member being only metalized (1) on said first end, (2) on said hole and (3) on said wall adjacent said second end but not touching said first end, said terminal being seated in said hole and a metallic bond joining said terminal to said metalized first end of said member and a metallic compressive bond joining the metalized portion of said wall to said base member thereby stressing said ceramic member in a direction where it is the strongest.

2. The ceramic standoff of claim 1 in which said wall is metalized from about the center of the height of said wall to said second end but not on said second end.

3. The ceramic standoff of claim 1 in which said hole is of size after being metalized to snugly receive said terminal.

4. The ceramic standoff of claim 1 in which said ceramic member and said hole are cylindrically shaped and said metalized wall portion forms a metalized band.

5. The ceramic assembly of claim 4 in which said ceramic member is seated in an opening of said base member and said metallic compressive bond joins said metalized band to the surface of said base member around said opening.

6. The ceramic standoff of claim 1 in which there is provided a plurality of said ceramic members each having an associated terminal, said ceramic members being joined each by a respective compressive bond to a common base member.

7. The method of manufacturing a ceramic standoff assembly having a ceramic member defining a first and and a second end and a wall therebetween with a blind hole in the first end thereof, a terminal and a base member comprising the steps of
metalizing said member only (1) on said first end, (2) on said hole and (3) on said wall adjacent the second end but not touching said first end,
seating said terminal within said hole,
forming a metallic bond to join said terminal to said metallized first end of said member, and
forming a metallic compressive bond to join the metalized wall portion to said base member.

8. The method of claim 7 which includes the step of nickel plating the metalized areas of said member.

References Cited

UNITED STATES PATENTS

| 2,722,496 | 11/1955 | Hosmer | 29—473.1 |
| 2,904,456 | 9/1959 | Nolte. | |
| 2,917,140 | 12/1959 | Omley | 287—189.365 |
| 3,001,269 | 9/1961 | Moore et al. | |
| 3,373,322 | 3/1968 | Hillman et al. | 174—50.61 X |
| 3,385,618 | 5/1968 | Hargis | 287—189.365 |

FOREIGN PATENTS

| 962,248 | 7/1964 | Great Britain. |

LARAMIE E. ASKIN, Primary Examiner

U.S. Cl. X.R.

287—189.365; 29—473.1